United States Patent
Wu (10) Patent No.: US 10,462,695 B2
(45) Date of Patent: Oct. 29, 2019

(54) DEVICE AND METHOD FOR HANDLING MEASUREMENT CONFIGURATION IN DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/992,216

(22) Filed: May 30, 2018

(65) Prior Publication Data

US 2018/0352462 A1 Dec. 6, 2018

Related U.S. Application Data

(60) Provisional application No. 62/513,400, filed on May 31, 2017.

(51) Int. Cl.
*H04W 24/10* (2009.01)
*H04W 76/15* (2018.01)
*H04W 76/19* (2018.01)

(52) U.S. Cl.
CPC ......... *H04W 24/10* (2013.01); *H04W 76/15* (2018.02); *H04W 76/19* (2018.02)

(58) Field of Classification Search
CPC ......... H04W 36/0022; H04W 76/028; H04W 76/19; H04W 36/305; H04W 36/30;
(Continued)

(56) References Cited

U.S. PATENT DOCUMENTS 9,253,704 B1 * 2/2016 Sarkar ................ H04W 36/30
2009/0061878 A1 * 3/2009 Fischer ................ G08C 17/02
455/436
(Continued)

FOREIGN PATENT DOCUMENTS

CN 105722137 A 6/2016
EP 2 373 080 A1 10/2011
(Continued)

OTHER PUBLICATIONS

Search Report dated Oct. 31, 2018 for EP application No. 18175168.6, pp. 1-4.
(Continued)

*Primary Examiner* — Jung Liu
(74) *Attorney, Agent, or Firm* — Winston Hsu (57) ABSTRACT

A communication device for handling a measurement configuration in a dual connectivity comprises at least one storage device for storing instructions and at least one processing circuit coupled to the at least one storage device. The at least one processing circuit is configured to execute the instructions stored in the at least one storage device. The instructions comprise establishing a first SRB; being configured a first measurement configuration by a first BS; transmitting a first measurement report to the first BS; receiving a first RRC message from the first BS; establishing a second SRB; being configured a second measurement configuration by a second BS; transmitting a second measurement report to the second BS; detecting a first failure on a first connection with the first BS; and releasing the second measurement configuration in response to the first failure on the first connection with the first BS.

14 Claims, 7 Drawing Sheets

(58) Field of Classification Search
CPC ..... H04W 36/04; H04W 24/10; H04W 76/15; H04W 76/18; H04W 72/04; H04L 5/0035; H04L 5/0055; H04L 5/0057; H04L 12/2869; H04L 12/5695; H04L 47/00; H04L 47/70; H04L 47/78; H04L 47/821; H04L 47/827
See application file for complete search history.

(56) References Cited

U.S. PATENT DOCUMENTS

| | | | | |
|---|---|---|---|---|
| 2010/0246382 | A1* | 9/2010 | Yi | H04L 63/12 370/216 |
| 2014/0187245 | A1* | 7/2014 | Xu | H04W 36/125 455/436 |
| 2014/0293958 | A1* | 10/2014 | Teyeb | H04W 36/24 370/331 |
| 2014/0321430 | A1* | 10/2014 | Bakker | H04W 36/0033 370/331 |
| 2015/0201354 | A1* | 7/2015 | Zhang | H04W 36/0022 370/221 |

FOREIGN PATENT DOCUMENTS

| | | |
|---|---|---|
| EP | 2 375 804 A1 | 10/2011 |
| EP | 2 945 423 A1 | 11/2015 |
| EP | 3 041 310 A1 | 7/2016 |
| EP | 3 128 785 A2 | 2/2017 |
| EP | 3 128 785 A3 | 2/2017 |

OTHER PUBLICATIONS

Office action dated Mar. 15, 2019 for the Taiwan application No. 107118614, filed May 31, 2018, p. 1-13.
3GPP TSG-RAN WG2 Meeting #98, R2-1705415, Hangzhou, China, May 15-19, 2017.
3GPP TSG-RAN WG2 Meeting #98, R2-1704659, Hangzhou, China, May 15-19, 2017.

* cited by examiner

DEVICE AND METHOD FOR HANDLING MEASUREMENT CONFIGURATION IN DUAL CONNECTIVITY

CROSS REFERENCE TO RELATED APPLICATIONS

This application claims the benefit of U.S. Provisional Applications No. 62/513,400 filed on May 31, 2017, which is incorporated herein by reference.

BACKGROUND OF THE INVENTION

1. Field of the Invention

The present invention relates to a device and a method used in a wireless communication system, and more particularly, to a device and a method of handling a measurement configuration in a dual connectivity in a wireless communication system.

2. Description of the Prior Art

In a dual connectivity, a communication device simultaneously connects to two base stations (BSs) of which one is in a master node (MN) and the other is in a secondary node (SN). When the communication device detects a failure of a connection with the MN, how to handle the problem associated to the measurement configuration of the SN is unknown.

SUMMARY OF THE INVENTION

The present invention therefore provides a communication device for handling a measurement configuration in a dual connectivity to solve the abovementioned problem.

A communication device for handling a measurement configuration in a dual connectivity comprises at least one storage device for storing instructions and at least one processing circuit coupled to the at least one storage device. The at least one processing circuit is configured to execute the instructions stored in the at least one storage device. The instructions comprise establishing a first signaling radio bearer (SRB) for communicating with a first base station; being configured a first measurement configuration by the first BS; transmitting a first measurement report associated to the first measurement configuration on the first SRB, to the first BS; receiving a first radio resource control (RRC) message on the first SRB from the first BS, wherein the first RRC message configures a second BS as a SN such that the communication device is in a dual connectivity with the first BS and the second BS; establishing a second SRB for communicating with the second BS, while the communication device is in the dual connectivity; being configured a second measurement configuration by the second BS; transmitting a second measurement report associated to the second measurement configuration on the second SRB to the second BS, while the communication device is in the dual connectivity; detecting a first failure on a first connection with the first BS; and releasing the second measurement configuration in response to the first failure on the first connection with the first BS.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
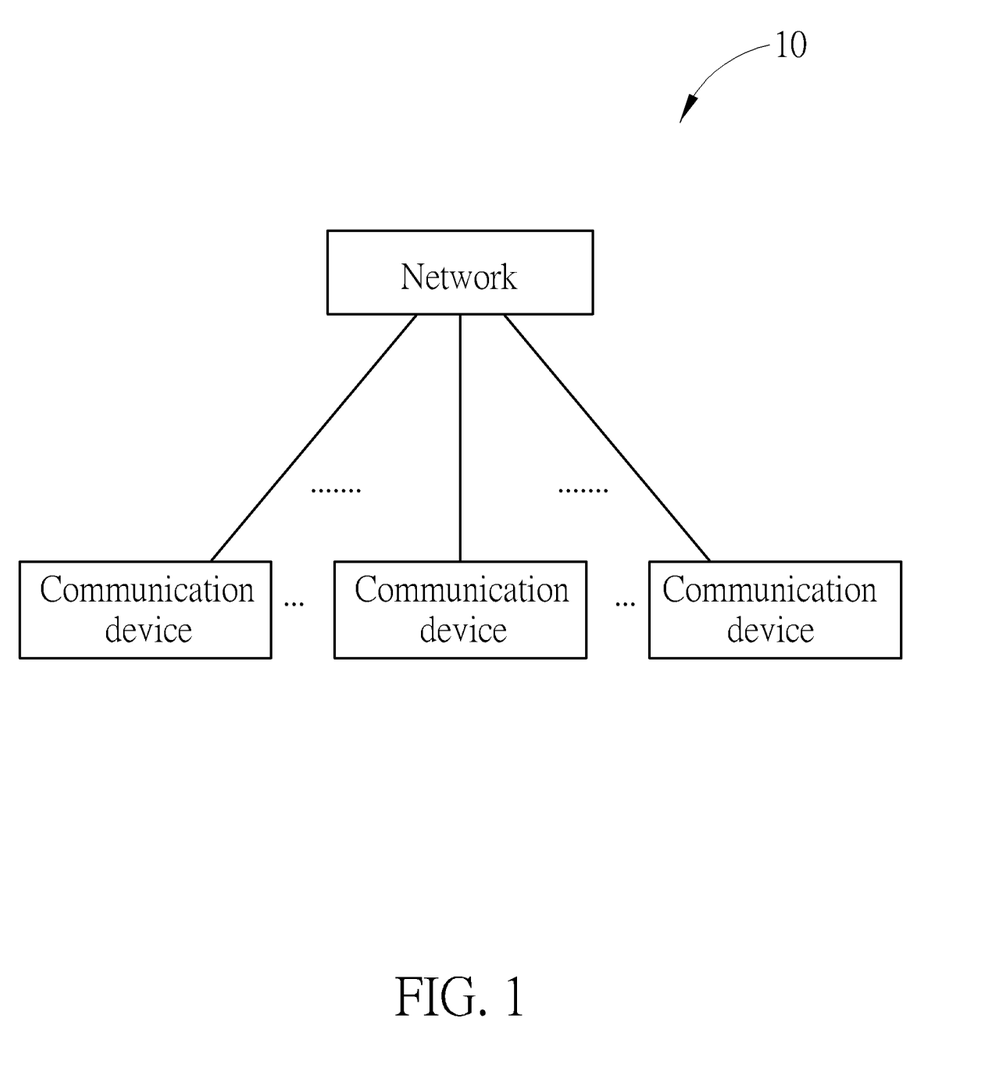
FIG. 1 is a schematic diagram of a wireless communication system according to an example of the present invention.

In FIG. 1, a network and communication devices are simply utilized for illustrating the structure of a wireless communication system 10. Practically, the network comprises at least one of a long-term evolution (LTE) network, an evolved LTE network, a new radio (NR) network and a sixth generation (6G) network. The 6G network includes at least one 6G BS and a NGC or 6G Core. The 6G radio communication technology may employ orthogonal frequency-division multiplexing (OFDM) or non-OFDM, a wider bandwidth (e.g., 200 MHz, 400 MHz, 1 GHz or 2 GHz) and a transmission time interval (TTI) shorter than 1 ms (e.g., 1, 2, 3 or 4 OFDM symbols, 100, or 200 us) for communicating between the communication devices and the 6G BS.

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
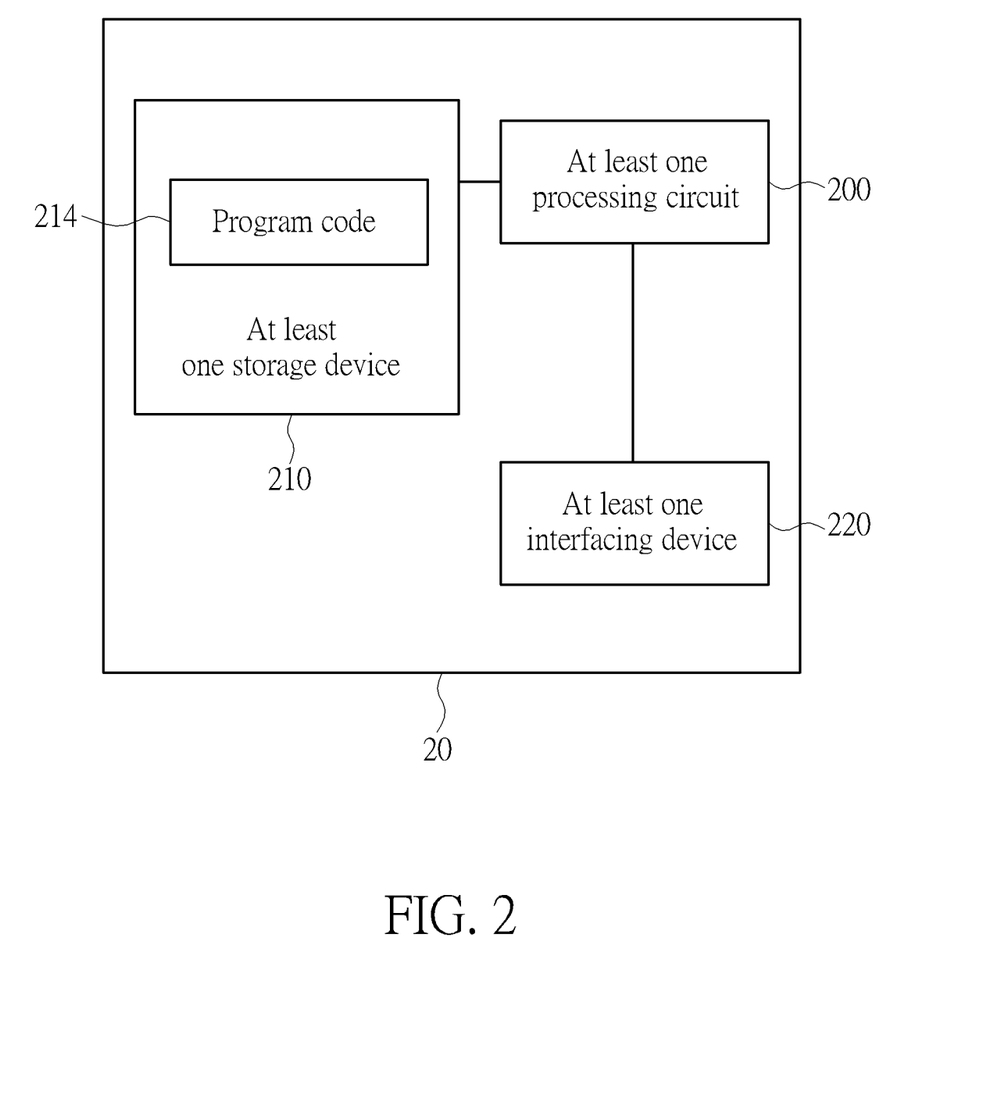
FIG. 2 is a schematic diagram of a communication device according to an example of the present invention.

In FIG. 2, a communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 comprises at least one transceiver used to transmit and receive signals (e.g., data, messages and/or packets) according to processing results of the at least one processing circuit 200.

In the following embodiments, a UE is used for representing a communication device in FIG. 1, to simplify the illustration of the examples.

A UE connects to a master node (MN) and has a first signaling radio bearer (SRB). The MN transmits a first measurement configuration on the first SRB to the UE. In details, the UE transmits a first measurement report on the first SRB to the MN according to the first measurement configuration. The MN initiates a secondary node (SN) Addition procedure with a SN for the UE in response to the first measurement report. The MN configures the UE to connect to the SN in response to the SN Addition procedure by transmitting a radio resource control (RRC) message (e.g., RRCConnectionReconfiguration message) on the first SRB to the UE. The RRC message includes a secondary cell group (SCG) configuration (or a SN configuration) for the UE to connect to the SN. In response to the RRC message, the UE establishes a second SRB. Thus, the UE is a dual connectivity (DC) with the MN and the SN, when the UE connects to the SN. The SN transmits a second measurement configuration on the second SRB to the UE while the UE is in the DC. The UE transmits a second measurement report to the SN on the second SRB according to the second measurement configuration.

Figure 3:
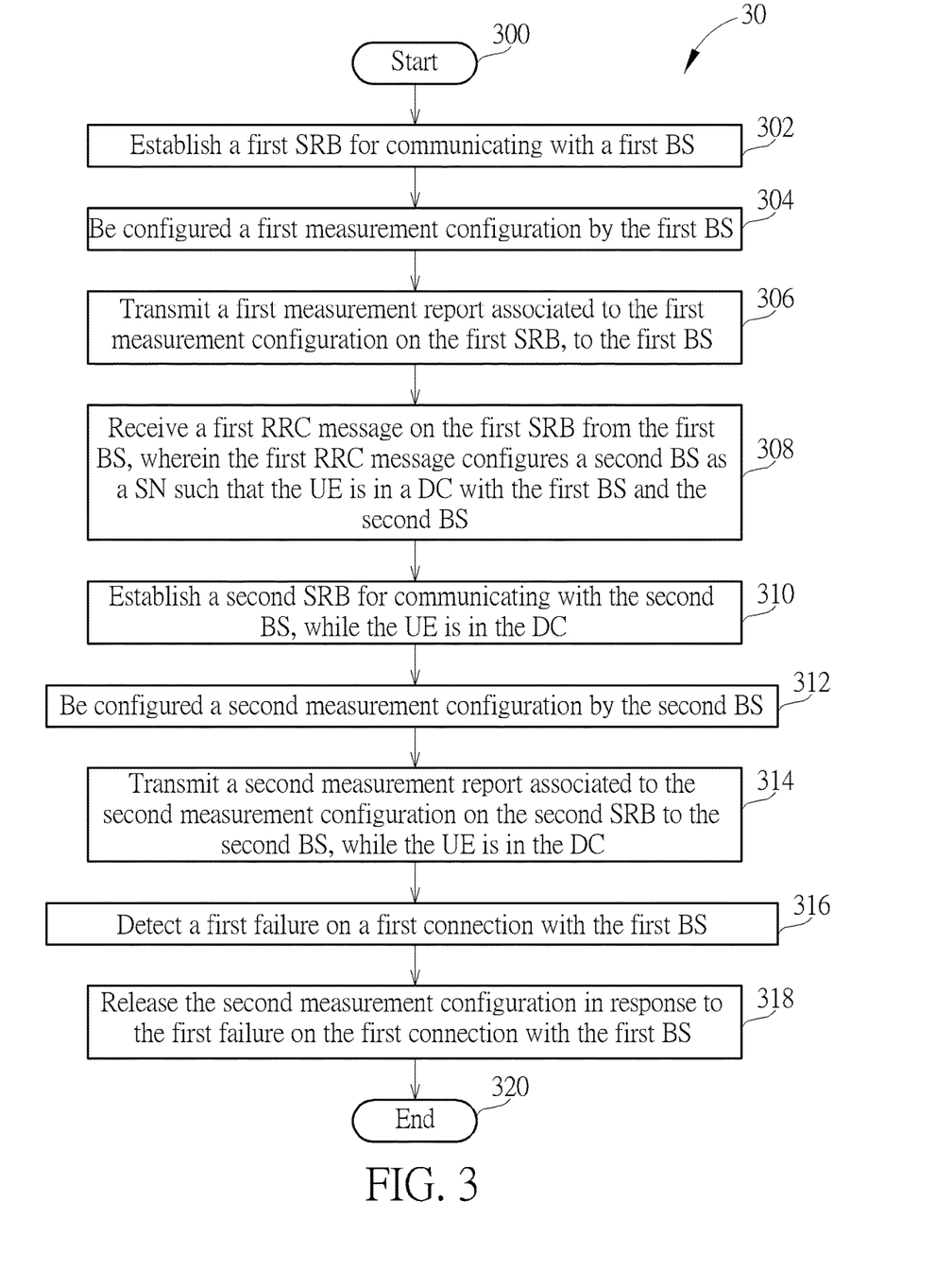
FIG. 3 is a flowchart of a process according to an example of the present invention.

A process 30 in FIG. 3 is utilized in a UE for handling a measurement configuration, and includes the following steps:

Step 300: Start.

Step 302: Establish a first SRB for communicating with a first BS.

Step 304: Be configured a first measurement configuration by the first BS.

Step 306: Transmit a first measurement report associated to the first measurement configuration on the first SRB, to the first BS.

Step 308: Receive a first RRC message on the first SRB from the first BS, wherein the first RRC message configures a second BS as a SN such that the UE is in a DC with the first BS and the second BS.

Step 310: Establish a second SRB for communicating with the second BS, while the UE is in the DC.

Step 312: Be configured a second measurement configuration by the second BS.

Step 314: Transmit a second measurement report associated to the second measurement configuration on the second SRB to the second BS, while the UE is in the DC.

Step 316: Detect a first failure on a first connection with the first BS.

Step 318: Release the second measurement configuration in response to the first failure on the first connection with the first BS.

Step 320: End.

The following examples may be applied to the process 30.

In one example, the UE receives the first measurement configuration in response to the first failure on the first connection with the first BS. The UE receives the second measurement configuration from the second BS (or directly on the second SRB or via the first BS on the first SRB) while the UE is in the DC.

In one example, the UE keeps (e.g., maintains) the first measurement configuration, in response to the first failure on the first connection with the first BS. That is, the UE in the DC determines to keep a measurement configuration depending on the measurement configuration configured by the first BS or the second BS.

In one example, the UE releases the first measurement configuration, in response to the first failure. That is, the UE in the DC determines to release a measurement configuration, irrespective of the measurement configuration configured by the first BS or the second BS.

In one example, the first RRC message includes a SCG configuration generated by the second BS for the UE. The SCG configuration configures how the UE communicates with the second BS. The SCG configuration includes at least one of a physical cell identity (PCI), a carrier information, a temporary identifier (e.g., Cell Radio Network Temporary Identifier (C-RNTI)) assigned to the UE, a physical layer configuration (e.g., for physical channel (s), a transmission mode, a reference signal, a channel state information reporting, etc.), a medium access control (MAC) configuration and at least one RB configuration. The at least one RB configuration includes a SRB configuration or a data RB (DRB) configuration. Each of the at least one RB configuration includes at least one of a RB identity and a RLC configuration. The SRB configuration configures the second SRB to the UE. The DRB configuration configures a SCG part of a DRB (e.g., MCG split bearer), a DRB of a SCG bearer or a DRB of a SCG split bearer. The RB configuration includes or does not include a PDCP configuration. In one example, the UE releases the SCG configuration, in response to the first failure on the first connection with the first BS. In one example, the UE keeps the SCG configuration, in response to the first failure on the first connection with the first BS (hereinafter referred as the first failure). In one example, the UE releases part of the SCG configuration and keeps part of the SCG configuration, in response to the first failure. For example, the UE releases at least one of the PCI, the carrier information, the temporary identifier, the physical layer configuration and the MAC configuration. The UE keeps the DRB configuration, in response to the first failure. In one example, the first RRC message includes the DRB configuration instead of the SCG configuration.

In one example, the first SRB is a MCG bearer or a MCG split bearer. The second SRB is a SCG bearer or a SCG split bearer. In one example, the first SRB is a SRB 1 which is the MCG bearer or the MCG split bearer. The second SRB is a SRB 3 which is the SCG bearer or the SCG split bearer.

In one example, the first failure is a radio link failure, a handover failure, an integrity check failure or a RRC connection reconfiguration failure. The UE performs a RRC connection reestablishment procedure with the first BS to recover the first failure. The UE transmits a RRCConnectionReestablshmentRequest message of the RRC connection reestablishment procedure to the first BS or a third BS (e.g., on a SRB 0). When the UE receives a RRCConnectionReestablshment message, the UE successfully recovers the first failure on the first connection with the first BS.

In one example, the UE detects a second failure on a second connection with the second BS (hereinafter referred as the second failure). The second failure is a radio link failure, a handover failure, an integrity check failure or a RRC connection reconfiguration failure. In one example, the UE keeps the second measurement configuration, in response to the second failure. In one example, the UE releases the second measurement configuration, in response to the second failure.

In one example, the UE suspends a communication (e.g., transmission and reception) with the second BS, in response to the second failure. The UE does not perform a measurement according to the second measurement configuration, when the second measurement configuration is kept.

In one example, the UE keeps the SCG configuration, in response to the second failure. In one example, the UE modifies or does not modify the kept SCG configuration (e.g., changes or releases a configuration in the SCG configuration), in response to the second failure. The UE transmits a RRC information message (e.g., a SCGFailureInformation message) on the first SRB to inform the first BS of the second failure.

In one example, the UE receives a third measurement configuration on the first SRB from the first BS, in response to the RRC connection reestablishment procedure or the RRC information message. The third measurement configuration is the same as or different from the second measurement configuration.

In one example, the third measurement configuration configures the UE to measure a same carrier configured by the second measurement configuration. The third measurement configuration configures a second event (for event-triggered measurement reporting) different from a first event configured by the second measurement configuration. In one example, the third measurement configuration configures the UE to measure a same carrier configured by the second measurement configuration, and configures a same event configured by the second measurement configuration.

In one example, the UE transmits a third measurement report on the first SRB, to the first BS, according to the third measurement configuration. Thus, the UE receives a second RRC message (e.g., a RRCConnectionReconfiguration message) from the first BS, wherein the second RRC message reconfigures the SCG configuration according to the third measurement configuration. The UE resumes the communication with the second BS or a third BS according to the second RRC message. The UE transmits a second RRC response message (e.g., a RRCConnectionReconfiguration-Complete message) to the first BS.

Figure 4:
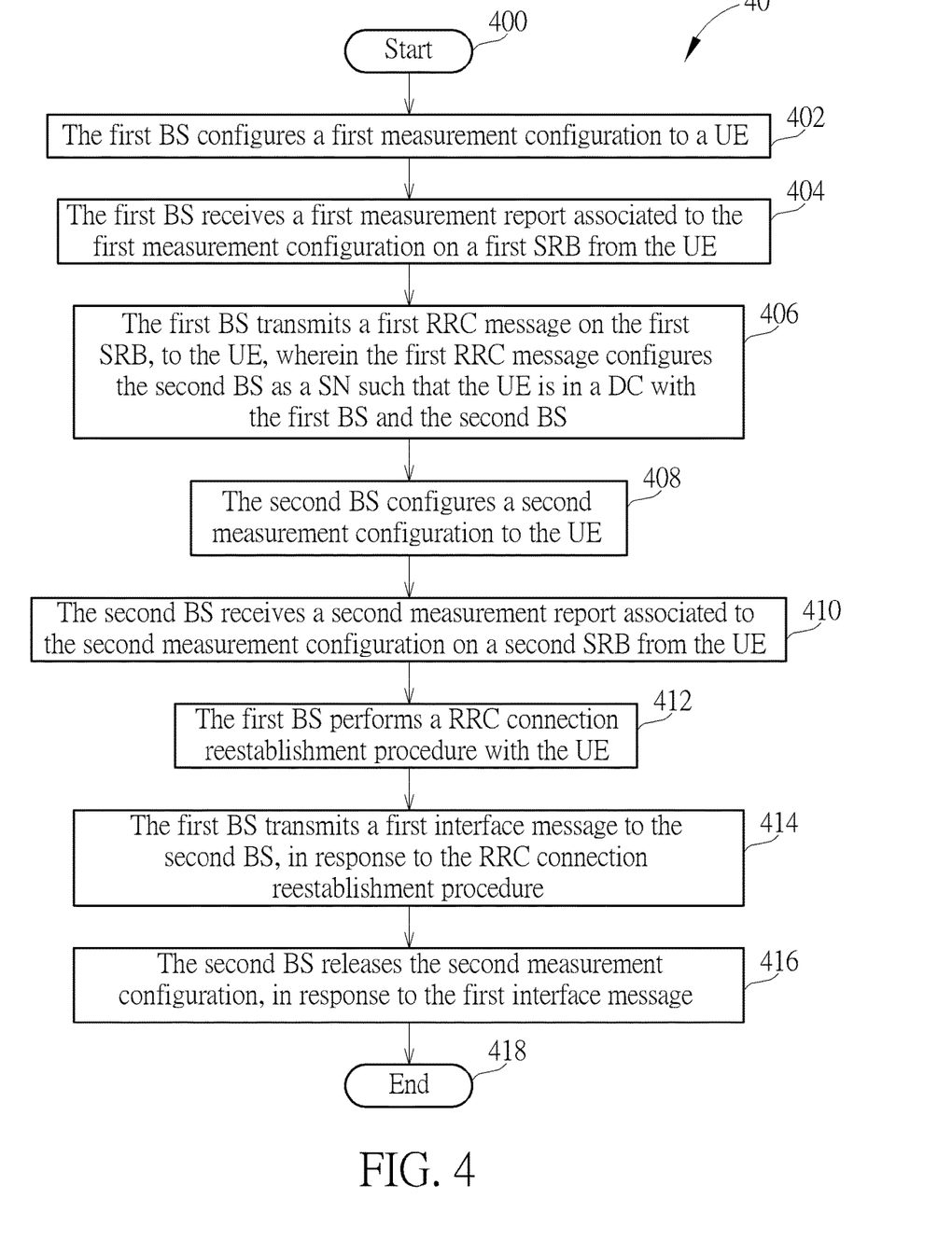
FIG. 4 is a flowchart of a process according to an example of the present invention.

A process 40 in FIG. 4 is utilized in a network comprising a first BS and a second BS, for handling measurement configuration, and includes the following steps:
Step 400: Start.
Step 402: The first BS configures a first measurement configuration to a UE.
Step 404: The first BS receives a first measurement report associated to the first measurement configuration on a first SRB from the UE.
Step 406: The first BS transmits a first RRC message on the first SRB, to the UE, wherein the first RRC message configures the second BS as a SN such that the UE is in a DC with the first BS and the second BS.
Step 408: The second BS configures a second measurement configuration to the UE.
Step 410: The second BS receives a second measurement report associated to the second measurement configuration on a second SRB from the UE.
Step 412: The first BS performs a RRC connection reestablishment procedure with the UE.
Step 414: The first BS transmits a first interface message to the second BS, in response to the RRC connection reestablishment procedure.
Step 416: The second BS releases the second measurement configuration, in response to the first interface message.
Step 418: End.

Examples described for the process 30 may be applied to the process 40. The following examples may be applied to the process 40.

In one example, the first interface message is a SN Release Request message. In one example, the second BS transmits a second interface message to the first BS, in response to the first interface message. In one example, the first interface message indicates the release of the second measurement configuration, a failure on a connection with the second BS or a suspension of a communication with the UE. The first interface message does not need release of the SCG configuration or does not indicate release of the SN. In one example, the first interface message is a SN Modification Request message, and the second interface message is a SN Modification Request Acknowledge message.

In one example, the first BS keeps the first measurement configuration in response to the RRC connection reestablishment procedure or the first failure on the connection with the first BS, if the UE keeps the first measurement configuration in response to the RRC connection reestablishment or the first failure.

In one example, the second BS releases the SCG configuration, in response to the first interface message. In one example, the second BS keeps or modifies the SCG configuration, in response to the first interface message. The second BS releases or does not release part of the SCG configuration, in response to the first interface message. In one example, the second BS releases at least one of the physical cell identity, the carrier information, the temporary identifier, the physical layer configuration and the MAC configuration, and keeps the RB configuration, in response to the first interface message.

Figure 5:
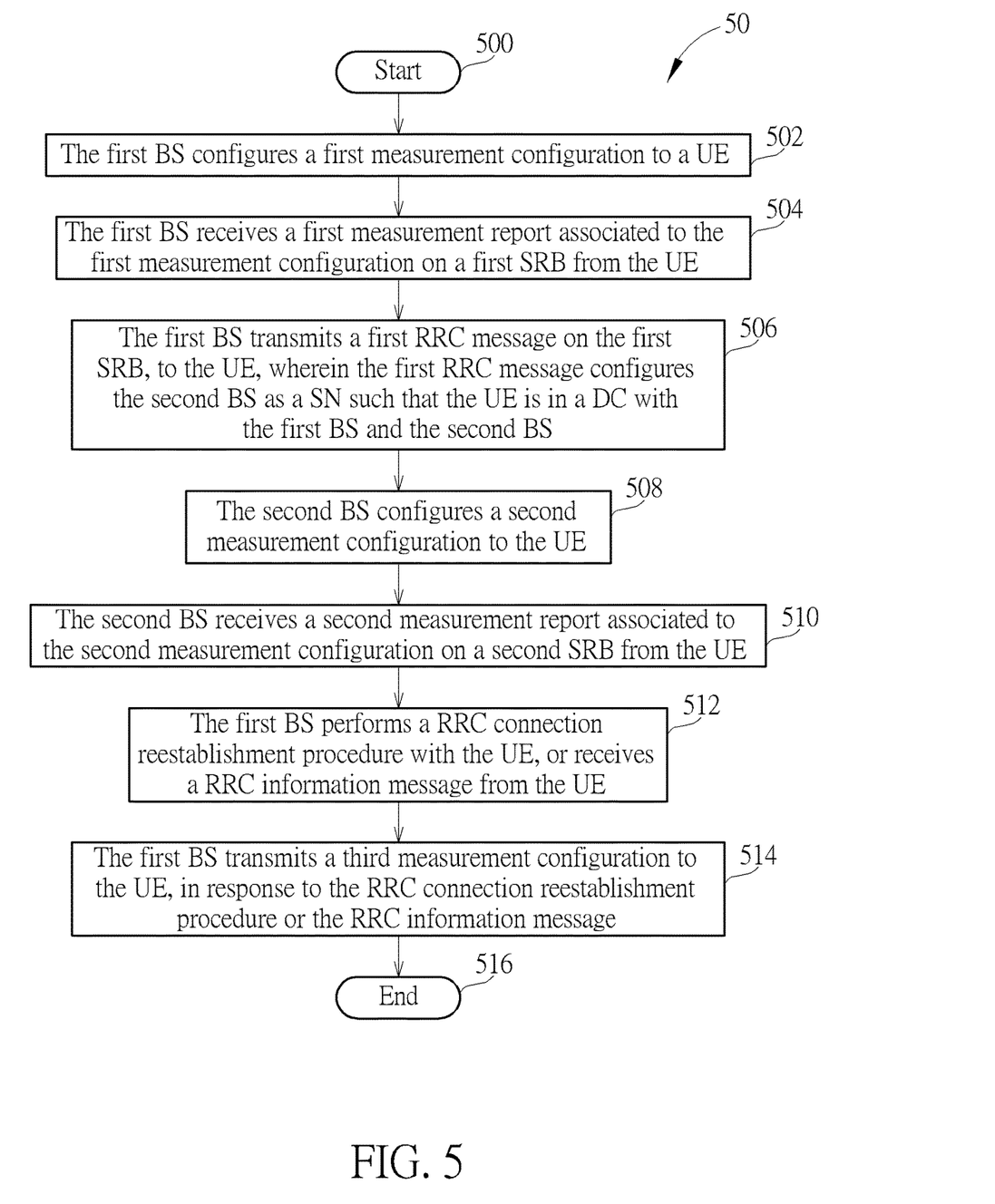
FIG. 5 is a flowchart of a process according to an example of the present invention.

A process 50 in FIG. 5 is utilized in a network comprising a first BS and a second BS, for handling a measurement configuration, and includes the following steps:
Step 500: Start.
Step 502: The first BS configures a first measurement configuration to a UE.
Step 504: The first BS receives a first measurement report associated to the first measurement configuration on a first SRB from the UE.
Step 506: The first BS transmits a first RRC message on the first SRB, to the UE, wherein the first RRC message configures the second BS as a SN such that the UE is in a DC with the first BS and the second BS.
Step 508: The second BS configures a second measurement configuration to the UE.
Step 510: The second BS receives a second measurement report associated to the second measurement configuration on a second SRB from the UE.
Step 512: The first BS performs a RRC connection reestablishment procedure with the UE, or receives a RRC information message from the UE.
Step 514: The first BS transmits a third measurement configuration to the UE, in response to the RRC connection reestablishment procedure or the RRC information message.
Step 516: End.

Examples described for the process 30 may be applied to the process 50. The following examples may be applied to the process 50.

In one example, the first BS transmits the third measurement configuration to the UE, in response to the RRC connection reestablishment procedure or the RRC information message.

In one example, the first BS transmits or does not transmit an interface message to the second BS, in response to the RRC connection reestablishment procedure or the RRC information message. The second BS releases the second measurement configuration or a configuration in the SCG configuration in response to the interface message.

Figure 6:
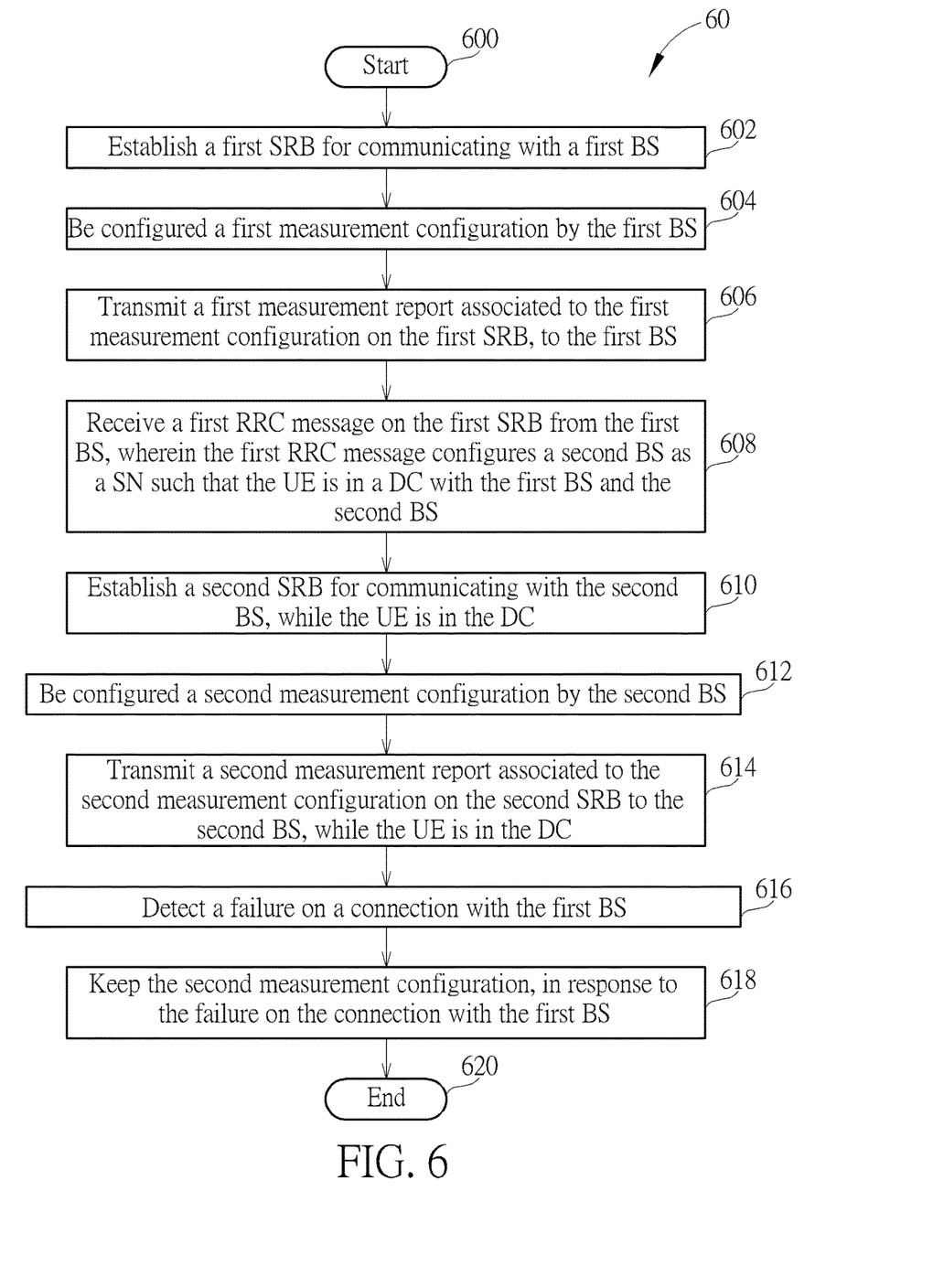
FIG. 6 is a flowchart of a process according to an example of the present invention.

A process 60 in FIG. 6 is utilized in a UE for handling a measurement configuration, and includes the following steps:
Step 600: Start.
Step 602: Establish a first SRB for communicating with a first BS.
Step 604: Be configured a first measurement configuration by the first BS.
Step 606: Transmit a first measurement report associated to the first measurement configuration on the first SRB, to the first BS.

Step 608: Receive a first RRC message on the first SRB from the first BS, wherein the first RRC message configures a second BS as a SN such that the UE is in a DC with the first BS and the second BS.

Step 610: Establish a second SRB for communicating with the second BS, while the UE is in the DC.

Step 612: Be configured a second measurement configuration by the second BS.

Step 614: Transmit a second measurement report associated to the second measurement configuration on the second SRB to the second BS, while the UE is in the DC.

Step 616: Detect a failure on a connection with the first BS.

Step 618: Keep the second measurement configuration, in response to the failure on the connection with the first BS.

Step 620: End.

Examples described for the process 30 may be applied to the process 60.

Figure 7:
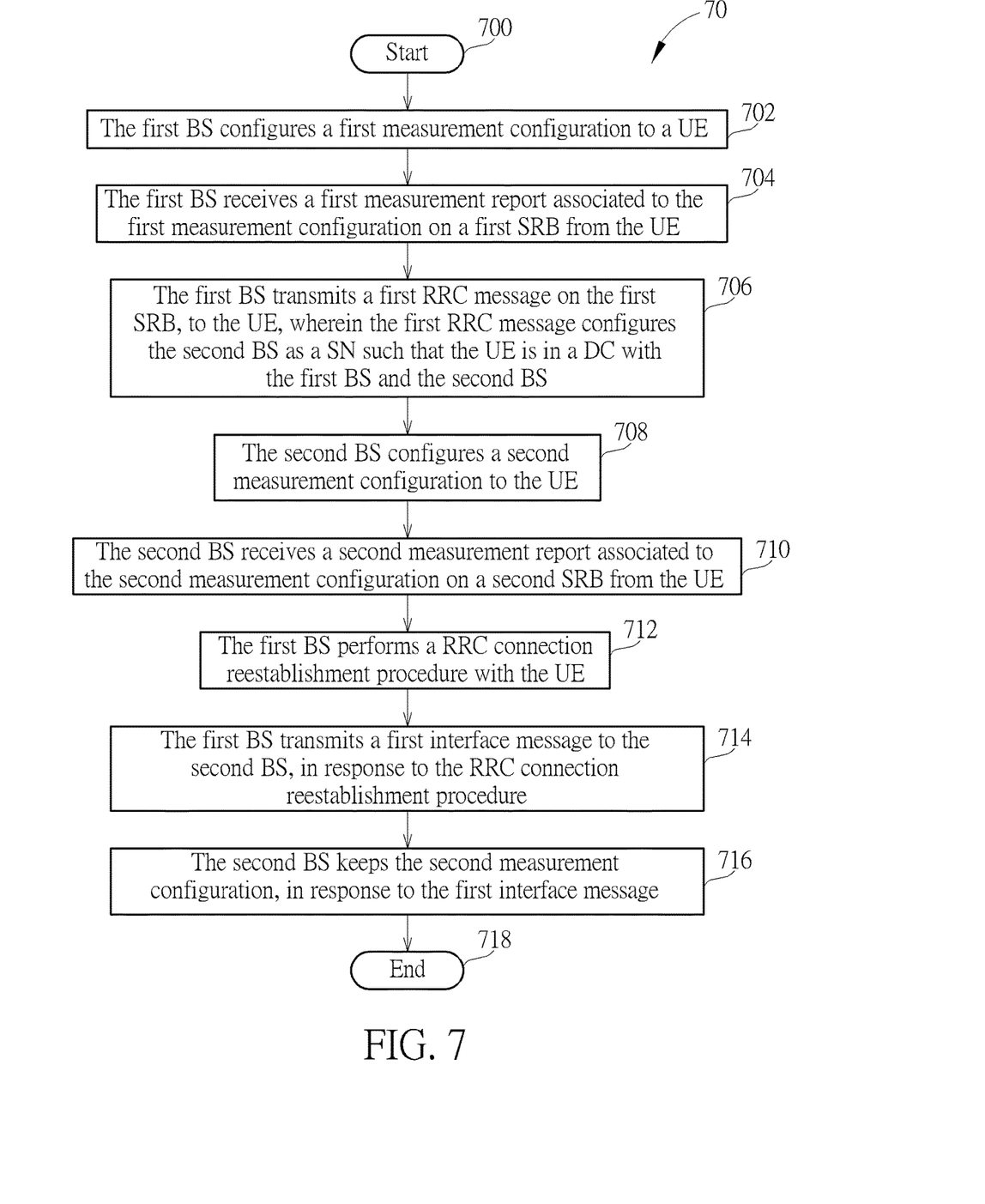
FIG. 7 is a flowchart of a process according to an example of the present invention.

A process 70 in FIG. 7 is utilized in a network comprising a first BS and a second BS, for handling a measurement configuration in a dual connectivity, and includes the following steps:

Step 700: Start.

Step 702: The first BS configures a first measurement configuration to a UE.

Step 704: The first BS receives a first measurement report associated to the first measurement configuration on a first SRB from the UE.

Step 706: The first BS transmits a first RRC message on the first SRB, to the UE, wherein the first RRC message configures the second BS as a SN such that the UE is in a DC with the first BS and the second BS.

Step 708: The second BS configures a second measurement configuration to the UE.

Step 710: The second BS receives a second measurement report associated to the second measurement configuration on a second SRB from the UE.

Step 712: The first BS performs a RRC connection reestablishment procedure with the UE.

Step 714: The first BS transmits a first interface message to the second BS, in response to the RRC connection reestablishment procedure.

Step 716: The second BS keeps the second measurement configuration, in response to the first interface message.

Step 718: End.

Examples described for the processes 30 and 40 may be applied to the process 70.

The following examples can be applied to the processes 30-70.

In one example, both of the first and second measurement configurations configure the UE to measure a first carrier (i.e., the same carrier). In one example, the first and second measurement configurations include or indicate a first Absolute Radio Frequency Channel Number (ARFCN) (i.e., the same ARFCN) indicating the first carrier.

In one example, the first measurement configuration configures the UE to measure a first carrier. The second measurement configuration configures the UE to measure a second carrier different from the first carrier. In one example, the first measurement configuration includes or indicates a first ARFCN. The second measurement configuration includes or indicates a second ARFCN different from the first ARFCN.

In one example, the measurement configurations mentioned above configure a reporting configuration specifying a reporting criterion (e.g., a periodic reporting or an event).

In one example, the first RRC message (e.g., RRCConnectionReconfiguration) is generated by the first BS or the second BS. The UE transmits the first RRC response message on the first SRB to the first BS or to the second BS via the first BS on the first SRB, in response to the first RRC message. In one example, the second BS generates the first RRC message, and transmits the first RRC message to the first BS. The first BS encapsulates the first RRC message in a RRC message (e.g., a RRCConnectionReconfiguration message, a SCGReconfiguration message, a SCGReconfiguration message or a SCGReconfigurationCommand message), and transmits the RRC message to the UE on the first SRB. The UE transmits a RRC response message (e.g., a RRCConnectionReconfigurationComplete message, a SCGReconfigurationComplete message, a SCGReconfigurationComplete message or a SCGReconfigurationCommandComplete message) on the first SRB to the first BS, in response to the RRC message. The RRC response message includes or does not include the first RRC response message. In case that the first RRC response is included in the RRC response message, the first BS transmits the first RRC response message to the second BS. Examples above are applied to the second RRC message and the second RRC response message.

In one example, the second measurement configuration is generated by the second BS. In one example, the second measurement configuration is included in the first RRC message. In one example, the second measurement configuration is included in a third RRC message (e.g., a RRCConnectionReconfiguration message) generated by the second BS and is transmitted by the second BS on the second SRB to the UE, while the UE is in DC with the first BS and the second BS. In response to the third RRC message, the UE transmits a third RRC response message (e.g., a RRCConnectionReconfigurationComplete message) on the second SRB to the second BS.

In one example, the first measurement configuration is generated by the first BS. The first measurement configuration is included in a fourth RRC message (e.g., a RRCConnectionReconfiguration message) which is generated and transmitted to the UE by the first BS on the first SRB. The UE transmits the fourth RRC response message (e.g., a RRCConnectionReconfigurationComplete message) on the first SRB to the first BS in response to the fourth RRC message. In one example, the first measurement configuration is received by the first BS and the UE from a third BS. The first BS implicitly configures the first measurement configuration to the UE by making the UE keep using the first measurement configuration in a handover command.

In one example, the first BS is an eNB, and the second BS is a gNB. In one example, the first BS is a gNB, and the second BS is an eNB. In one example, the first BS and the second BS are gNBs.

In one example, the UE detects the first failure on the first connection with the first BS according to a specific condition or criterion specified by standard specification(s). The UE detects the second failure on the second connection with the second BS according to a specific condition or criterion specified by standard specification(s).

In one example, the UE establishes the first SRB, in response to a RRC connection establishment procedure. In one example, the UE performs the RRC connection establishment procedure by transmitting a RRCConnectionRequest message to a BS (e.g., the first BS, the third BS or a fourth BS). The BS transmits a RRCConnectionSetup message configuring the first SRB to the UE, in response to the RRCConnectionRequest message.

In one example, the UE establishes the second SRB, in response to the first RRC message. That is, the first RRC message configures the second SRB.

In the descriptions above, "carrier" may be replaced by "frequency" or "carrier frequency".

It should be noted that although the above examples are illustrated to clarify the related operations of corresponding processes, the examples can be combined or modified arbitrarily according to system requirements or design considerations.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides methods and devices for handling measurement configuration in dual connectivity. When the UE in the dual connectivity detects the failure on the connection with a first BS, the UE releases the second measurement configuration, in response to the failure. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling measurement configuration in dual connectivity (DC), comprising:
    at least one storage device; and
    at least one processing circuit, coupled to the at least one storage device, wherein the at least one storage device stores, and the at least one processing circuit is configured to execute instructions of:
    establishing a first signaling radio bearer (SRB) for communicating with a first base station (BS);
    being configured a first measurement configuration by the first BS;
    transmitting a first measurement report associated to the first measurement configuration on the first SRB, to the first BS;
    receiving a first radio resource control (RRC) message on the first SRB from the first BS, wherein the first RRC message configures a second BS as a secondary node (SN) such that the communication device is in a DC with the first BS and the second BS;
    establishing a second SRB for communicating with the second BS, while the communication device is in the DC;
    being configured a second measurement configuration by the second BS;
    transmitting a second measurement report associated to the second measurement configuration on the second SRB to the second BS, while the communication device is in the DC;
    detecting a first failure on a first connection with the first BS; and
    releasing the second measurement configuration in response to the first failure on the first connection with the first BS.

2. The communication device of claim 1, wherein the instructions further comprise:
    keeping the first measurement configuration, in response to the first failure on the first connection with the first BS.

3. The communication device of claim 1, wherein the instructions further comprise:
    releasing the first measurement configuration, in response to the first failure on the first connection with the first BS.

4. The communication device of claim 1, wherein the instructions further comprise:
    detecting a second failure on a second connection with the second BS;
    keeping the second measurement configuration, in response to the second failure on the second connection with the second BS; or
    releasing the second measurement configuration, in response to the second failure on the second connection with the second BS.

5. The communication device of claim 1, wherein the instructions further comprise:
    releasing a SCG configuration, in response to the first failure on the first connection with the first BS.

6. A network comprising a first base station (BS) and a second BS for handling measurement configuration in dual connectivity (DC), comprising:
    at least one storage device; and
    at least one processing circuit, coupled to the at least one storage device, wherein the at least one storage device stores, and the at least one processing circuit is configured to execute instructions of:
    the first BS configuring a first measurement configuration to a communication device;
    the first BS receiving a first measurement report associated to the first measurement configuration on a first signaling radio bearer (SRB) from the communication device;
    the first BS transmitting a first radio resource control (RRC) message on the first SRB, to the communication device, wherein the first RRC message configures the second BS as a secondary node (SN) such that the communication device is in a DC with the first BS and the second BS;
    the second BS configuring a second measurement configuration to the communication device;
    the second BS receiving a second measurement report associated to the second measurement configuration on a second SRB from the communication device;
    the first BS performing a RRC connection reestablishment procedure with the communication device;
    the first BS transmitting a first interface message to the second BS, in response to the RRC connection reestablishment procedure; and
    the second BS releasing the second measurement configuration, in response to the first interface message.

7. The network of claim 6, wherein the first interface message indicates the release of the second measurement configuration, a failure on a connection with the second BS or a suspension of a communication with the communication device.

8. The network of claim 6, wherein the instructions further comprise:
- the first BS keeping the first measurement configuration, in response to the RRC connection reestablishment procedure, if the communication device keeps the first measurement configuration; and
- the first BS releasing the first measurement configuration, if the communication device releases the first measurement configuration.

9. The network of claim 6, wherein the instructions further comprise:
- the second BS keeps a data radio bearer configuration, in response to the first interface message.

10. The network of claim 6, wherein the instructions further comprise:
- the first BS transmitting a third measurement configuration on the first SRB to the communication device, in response to the RRC connection reestablishment procedure.

11. The network of claim 10, wherein the instructions further comprise:
- the first BS receiving a third measurement report on the first SRB, from the communication device, according to the third measurement configuration; and
- the first BS transmitting a second RRC message to the communication device, wherein the second RRC message reconfigures a secondary cell group (SCG) configuration according to the third measurement configuration.

12. A network comprising a first base station (BS) and a second BS for handling measurement configuration in dual connectivity (DC), comprising:
- at least one storage device; and
- at least one processing circuit, coupled to the at least one storage device, wherein the at least one storage device stores, and the at least one processing circuit is configured to execute instructions of:
  - the first BS configuring a first measurement configuration to a communication device;
  - the first BS receiving a first measurement report associated to the first measurement configuration on a first signaling radio bearer (SRB) from the communication device;
  - the first BS transmitting a first radio resource control (RRC) message on the first SRB, to the communication device, wherein the first RRC message configures the second BS as a secondary node (SN) such that the communication device is in a DC with the first BS and the second BS;
  - the second BS configuring a second measurement configuration to the communication device;
  - the second BS receiving a second measurement report associated to the second measurement configuration on a second SRB from the communication device;
  - the first BS performing a RRC connection reestablishment procedure with the communication device, or receiving a RRC information message from the communication device; and
  - the first BS transmitting a third measurement configuration to the communication device, in response to the RRC connection reestablishment procedure or the RRC information message.

13. The network of claim 12, wherein the first BS transmits the third measurement configuration to the communication device, in response to the RRC connection reestablishment procedure or the RRC information message.

14. The network of claim 12, wherein the instructions further comprise:
- the first BS transmitting an interface message to the second BS, in response to the RRC connection reestablishment procedure or the RRC information message.

* * * * *